United States Patent [19]
Hohne et al.

[11] 3,900,342
[45] Aug. 19, 1975

[54] SILVER CATALYST AND A METHOD OF ITS MANUFACTURE

[75] Inventors: Karl Hohne; Renate Bogusch, both of Erlangen, Germany

[73] Assignee: Siemens Aktiengesellschaft, Munich, Germany

[22] Filed: Apr. 28, 1972

[21] Appl. No.: 248,386

[30] Foreign Application Priority Data
May 3, 1971 Germany.............................. 2121748

[52] U.S. Cl....................... 136/120 FC; 136/120 R
[51] Int. Cl. ........................................... H01m 13/00
[58] Field of Search............ 136/120, 120 FC, 86 D, 136/20; 75/.5 A, .5 AA, .5 BA, 108, 109; 252/472, 474, 476

[56] References Cited
UNITED STATES PATENTS
3,201,223   8/1965   Cuhra et al........................... 75/.5 A
3,369,886   2/1968   Metzger et al....................... 75/.5 A FOREIGN PATENTS OR APPLICATIONS
1,947,422   4/1971   Germany Primary Examiner—Anthony Skapars
Attorney, Agent, or Firm—Kenyon & Kenyon Reilly Carr & Chapin

[57] ABSTRACT

A silver-containing catalyst, adapted for employment in fuel cell electrodes, comprising metallic silver chemically reduced and precipitated on a metal hydroxide gel, such as a plurality of hydroxides of bismuth, cobalt, iron, nickel and/or titanium. The total metal of the hydroxide comprises about 0.5 to 5 weight %, based on the total silver, in the finished catalyst.

The amount of hydroxides employed is only that required as carrier in the finished catalyst.

The catalyst is prepared by slowly adding a silver salt solution and reducing agent to an alkaline solution of the hydroxides, preferably with stirring and at a low (e.g. 0°–15°C) temperature. Thereafter, the supernatant liquid is separated and the solid dried.

10 Claims, 4 Drawing Figures

SILVER CATALYST AND A METHOD OF ITS MANUFACTURE

The invention relates to a method for the manufacture of a silver catalyst through reduction of a silver salt and precipitation of the metallic silver on metal hydroxide gel which, in the finished catalyst, comprises in the amount of 0.5 to 5% by weight, relative to the silver catalyst, and a silver catalyst prepared according to such method.

It is known to use silver in the cathodes of fuel cells and fuel cell batteries as the catalyst for the reduction of oxygen. In fuel cell batteries with an alkaline electrolyte, Raney silver, for instance, is known to be highly suitable.

For the preparation of Raney silver, it is necessary to melt silver alloys which contain two or more components, for example, a silver-aluminum alloy of suitable composition. After cooling, the globules produced in the process must be comminuted into powder form, such as by ball milling. This is a slow process requiring considerable labor per unit of production, particularly if a large fraction with a particle size of less than 50 microns is to be obtained, which is generally the case for use as catalytic material. The ductility of the silver alloys also causes difficulties in milling. In the preparation of Raney silver, the inactive component is subsequently leached or dissolved out from the comminuted particles of alloy.

In order to avoid the difficulties that arise in the preparation of Raney silver, it has been previously proposed to manufacture silver catalysts in a manner in which metallic silver is first precipitated on a gel-like metal hydroxide through reduction of a solution of silver salt, and the metal hydroxide is subsequently dissolved out. In such a procedure, it is advantageous not to dissolve out the metal hydroxide completely; preferably, quantities of about 0.5 to 5% by weight of metal hydroxide, relative to the silver, should be contained in the finished catalyst. Aluminum hydroxide, cobalt hydroxide, cadmium hydroxide or nickel hydroxide have been proposed as the metal hydroxide which is used as the carrier.

To some extent, however, such a method is still somewhat expensive, as several process steps are required. Moreover, most of the original hydroxide carrier is removed by leaching, which is not desirable from an economic point of view.

It is an object of the invention to give a simplified and further improved method for the manufacture of a silver catalyst through reduction of a silver salt and precipitation of metallic silver on a metal hydroxide gel.

It is an additional object to prepare silver catalysts having an increased electro-chemical activity when employed in fuel cells.

According to the invention, this is achieved through the use of commingled hydroxides of at least two of the metals titanium, iron, cobalt, nickel and bismuth in an amount as is required in the finished catalyst, i.e., in an amount such that leaching excess hydroxide carrier is not required.

The method according to the invention is particularly characterized in that commingled hydroxides of several metals are employed, and specifically hydroxides of at least two of the metals titanium, iron, cobalt, nickel or bismuth. Preferably, one of the metal hydroxides used is bismuth hydroxide. The catalysts prepared by this method are characterized by increased activity as compared to Raney metal catalysts, as is illustrated in the examples.

Surprisingly, it has further been found that it is not necessary to precipitate the silver first on a relatively large quantity of hydroxide carrier material and subsequently, to dissolve (or leach) most of it. Rather, it is sufficient to employ only an amount of the gels of the metal hydroxides as is required for the finished catalyst. This amount is in the range of about 0.5 to 5% by weight relative to the silver in the silver catalyst.

Thus, in the method of manufacture of a silver catalyst by chemical reduction in an alkaline aqueous medium of a dissolved silver salt and precipitation of metallic silver on a metal hydroxide gel contained in such medium, the process invention comprises the improvement of employing a commingled mixture of at least two metal hydroxides in gel form, such hydroxides being present in the reaction zone in essentially the same amount thereof as required in the finished catalyst. The novel catalyst, suitable for use as a fuel cell electrode, comprises an unleached composite of predominantly metallic silver disposed on two or more commingled hydroxides of bismuth, cobalt, iron, nickel and titanium, preferably wherein the total metal content of such hydroxides is in the range of almost 0.5 to 5 weight %, based on the amount of silver in the finished catalyst.

In the method according to the invention, fewer process steps are required compared to the prior art methods, because it is no longer necessary to dissolve (or leach) excess carrier material, and in addition, an increase in activity is achieved. Furthermore, the quantity of metal hydroxide required is substantially reduced, since no leaching is required. The reagents, such as alkali solution or ammonia, required for leaching the excess carrier material are also no longer necessary.

An aqueous formaldehyde solution is preferably employed for reducing the silver ion of the dissolved silver salt. However, the reduction may also be carried out in a known manner with other reducing agents, such as a hydrazine, hydroxylamine or an alkaline stannite solution. If stannite solutions are used, however, the reproducibility of the manufactured catalysts is less reliable.

Silver nitrate is preferably used as the silver salt, but other soluble silver salts known in this art may also be used.

The catalyst may be prepared, for example, by very slowly adding an aqueous or weakly acidic solution of the silver salt and a reducing agent, preferably formaldehyde, to a gel-like suspension of the commingled metal hydroxides in an alkaline solution. The mixture of substances present, i.e., the alkaline gel suspension, preferably is stirred vigorously during the process. It has been found that catalysts with particularly high activity are obtained thereby. Also, the mixture is preferably maintained at a low temperature, about 0° to 15°C, during the addition of the silver salt solution and the reducing agent. During the reduction reaction, the silver separates out in the form of a gray-black metallic precipitate on the suspended gelatinous metal hydroxides. After the reaction is completed, the excess alkaline solution is separated by decanting or filtering from the solids (metallic silver deposited on the gelatinous hydroxides), which are then processed into the finished catalyst by washing and drying.

In the silver catalysts of this invention, one of the metal hydroxides contained in the catalyst is preferably bismuth hydroxide, the bismuth content of the catalyst advantageously being about 0.7–0.8% by weight relative to the silver in the catalyst. (For the sake of clarity, the amount of an hydroxide in the catalyst is stated herein as the amount of metal equivalent of the hydroxide, as a weight per cent of the silver contained in the catalyst.)

Advantageously, the silver catalysts contain in addition to bismuth hydroxide, one or more other metal hydroxides, such as the following additional hydroxides:

a. Cobalt hydroxide and nickel hydroxide, the cobalt content of the catalyst being preferably 0.4 to 0.5% by weight and the nickel content preferably 0.4 to 0.5% by weight;

b. Titanium hydroxide and nickel hydroxide, the titanium content of the catalyst being preferably about 0.1% by weight and the nickel content preferably 0.4 to 0.5% by weight; and c. Titanium hydroxide, iron hydroxide and nickel hydroxide, the titanium content of the catalyst being preferably about 0.1% by weight, the iron content preferably 0.3 to 0.6% by weight and the nickel content preferably 0.4 to 0.5% by weight.

The catalysts may also contain metal hydroxides in other combinations, for instance, Bi and Ti; Bi and Co; Bi and Ni; Bi Ti and Fe; Bi, Fe and Ni; Bi, Ti, Co and Ni. The content of the individual metals from the various hydroxides is in the same order of magnitude in all of these catalysts, in the range of about 0.1 to 1.0% by weight.

The catalysts prepared by the method according to the invention are preferably employed in electrodes for fuel cells and fuel cell batteries. The fabrication of the catalytic material into electrodes may be accomplished in a manner known in the art, i.e., the catalytic material may be present in the electrodes in the form of loose (i.e., without a binder) powder. However, it is advantageous to apply a sedimentation process for the fabrication of the electrodes. To this end, an aqueous suspension, which contains the catalytic material and asbestos fibers, is permitted to settle on a substrate. A binder for the catalytic material may optionally be added to the suspension. The silver electrodes obtained by such a procedure are easy to handle and are very stable, and exhibit a high catalytic activity even if the catalyst coating is kept very low, e.g., at about 50 mg/cm$^2$.

The invention will be explained in further detail with the aid of several examples of embodiments and the drawing, in which.

Figure 4:
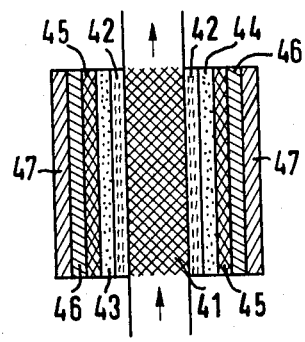

FIG. 4 schematically illustrates a fuel cell with an electrode comprising the new silver catalyst.

EXAMPLE 1

This example describes the preparation of a silver catalyst containing hydroxides of bismuth, cobalt and nickel. The hydroxides are prepared by adding solutions of 10 g of Ni (NO$_3$)$_2$ . 6 H$_2$O in 50 ml of water and of 10 g of co(NO$_3$)$_2$ . 6 H$_2$O in 50 ml of water to 2.8 liters of 6 N KOH. The metal hydroxides precipitate in the form of gels. The mixture is cooled with ice to about 0°–10°C. A mixture of the following solutions is added drop by drop, to the alkaline suspension of the metal hydroxides over a period of about 5 hours: 680 g of AgNO$_3$ in 4 liters of water; 4.8 g of BiONO$_3$ . H$_2$O (basic bismuth (III) nitrate) in 40 ml of concentrated HNO$_3$; and 800 ml of an aqueous 35% formaldehyde solution (formaline). While the solutions are being added, the reaction mixture is stirred vigorously. The reaction temperature should not exceed about 15°C. After the chemical reduction of the ionic silver is completed, the metallic silver precipitated on the gelatinous metal hydroxides is allowed to settle and the excess KOH solution is decanted. The precipitate is washed with water until the wash water has a neutral pH. Then the residual water is drawn off, the silver catalyst obtained is washed with acetone and dried under a low vacuum (e.g., as obtained from a water jet aspirator) for approximately 3 hours at about 110°–120°C.

Alternatively, the solution of the basic bismuth (III) nitrate in concentrated nitric acid may also be added, as are the solutions of the other metal salts, to the potassium hydroxide solution, prior to the addition of the silver mitrateformaldehyde solution, in which event the bismuth hydroxide is also precipitated. In this variation of the procedure, it is advisable to acidify the aqueous silver nitrate-formaldehyde solution slightly, e.g., by adding 20 ml of concentrated HNO$_3$, in order to prevent premature reduction of the silver nitrate.

The silver catalyst obtained, as described above, which contains commingled cobalt, nickel and bismuth hydroxides, is fabricated into an electrode in the following manner, and without leaching of the hydroxides or metal. 0.5 g of asbestos fibers are digested in 500 ml of water while being stirred with a turbo-agitator. The aqueous asbestos fiber suspension obtained is reacted under agitation with 2.0 g of an aqueous 40% polytetrafluorethylene latex and with 1.5 g of an aqueous 40% latex of an acrylonitrile-butadiene-styrene copolymerisate. About 21 g of the silver catalyst is added to this thus-prepared asbestos fiber-binder suspension while being stirred. The homogeneous suspension obtained is poured into a foil former which is furnished with a filter paper and has an inside diameter of about 21 cm. The suspension is briefly stirred with a vibrator and is then allowed to settle. Subsequently the water is drawn off and the filter paper with the filter cake is dried under an aspirator-induced vacuum for 2 hours at 110°–120°C. After drying, the filter paper is pulled off, and one obtains in this manner a film of very high mechanical stability, from which electrodes of the desired size may be cut. These electrodes exhibit an extremely uniform distribution of the catalytic material, and have a coating thickness of about 60 mg/cm$^2$.

The catalytic activity and the behavior in continuous operation of the electrodes containing the silver catalysts according to the invention were tested in a half-cell arrangement. The electrolyte was a 6 N KOH solution. Oxygen gas at a pressure of 0.16 N/mm$^2$ (approx. 1.6 atm) was employed. An Hg/HgO electrode was employed as the reference electrode.

Figure 1:
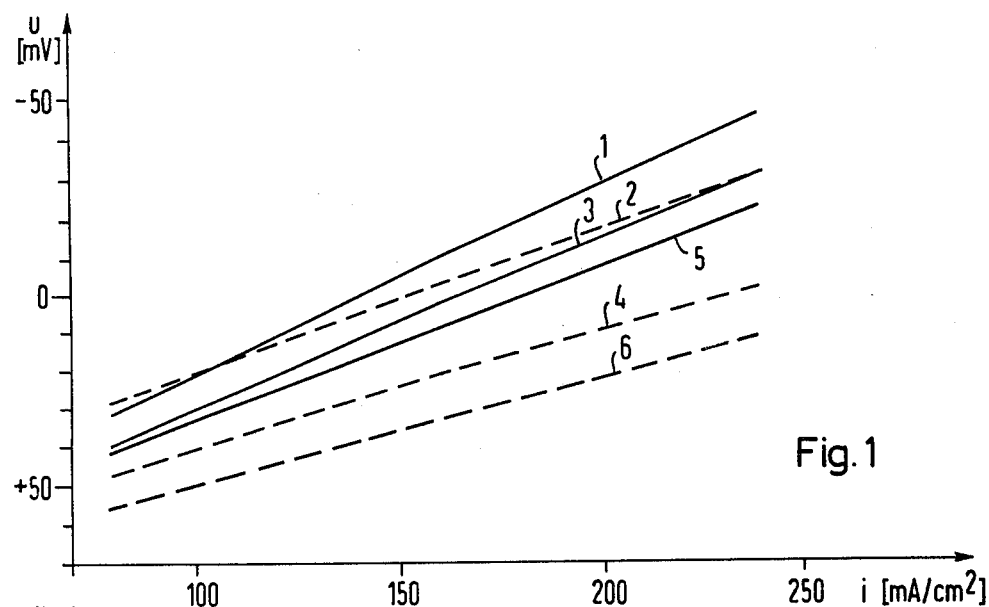
FIG. 1 depicts current-voltage curves for several electrodes with silver catalysts according to this invention.

The results obtained in the investigation are shown as current-voltage curves in FIG. 1. The current density (i, in mA/cm$^2$) is plotted on the abscissa; the voltage (U, in mV) measured against an Hg/HgO reference electrode is plotted on the ordinate. Curves 1 and 2 apply to electrodes with a silver catalyst prepared as described in Example 1 (with Bi, Co and Ni), the coating being 50 mg of catalyst per cm² of electrode surface. Curve 1 was measured at an electrolyte temperature of 60°C; curve 2, at an electrolyte temperature of 80°C.

EXAMPLE 2

Similarly as in Example 1, a silver catalyst is prepared which contains titanium, nickel and bismuth hydroxides. To this end, 2.8 liters of 6 N KOH are reacted with a solution of 10 g $Ni(NO_3)_2 \cdot 6 H_2O$ in 50 ml of water and 9.2 g of an aqueous 15% solution of $TiCl_3$. The metal hydroxides precipitate in the form of gels. Under agitation and while the alkaline gel suspension is at a low temperature, the mixture described in Example 1 of the solutions of silver nitrate, basic bismuth (III) nitrate and formaldehyde, are added slowly, drop-by-drop during a five hour period. The procedure is then completed as described in Example 1.

From the silver catalyst thus prepared (containing hydroxides of Bi, Ti and Ni), electrodes are prepared by the method described in Example 1 and are tested. The test results are shown in FIG. 1 as curves 3 and 4. They apply for electrodes with a catalyst coating thickness of about 50 mg/cm² at a temperature of 60°C (Curve 3) and 80°C (Curve 4). EXAMPLE 3

Similarly as described in Example 1, a silver catalyst is prepared which contains titanium, iron, nickel and bismuth hydroxides. To this end, 2.8 liters of 6 N KOH are reacted with solutions of 10 g of $Ni(NO_3)_2 \cdot 6 H_2O$ and 10 g of $FeSO_4 \cdot 7 H_2O$, each time in 50 ml of water, as well as 9.2 mg of an aqueous 15% solution of $TiCl_3$. To this is added slowly over a period of five hours the mixture described in Example 1 of the solutions of silver nitrate, basic bismuth (III) nitrate and formaldehyde. The resulting suspension of metallic silver and gel hydroxides is processed as described above.

Electrodes in the form of powder deposits are prepared from the silver catalyst made as described in the proceding paragraph and tested according to the method described in Example 1. The test results are shown in FIG. 1 as curves 5 and 6, which represent data from electrodes with a coating thickness of about 100 mg/cm² and operated, respectively, at a temperature of 60°C and 80°C.

In comparing curves 1 to 6 in FIG. 1, the Bi/Ti/Ni silver catalyst (Curves 3 and 4) is seen to have a somewhat better catalytic acitivity than the Bi/Co/Ni silver catalyst of curves 1 and 2. The Bi/Ti/Fe/Ni silver catalyst shows an activity which approximately corresponds to the activity of the Bi/Ti/Ni catalyst. Curves 5 and 6 are not directly comparable to curves 1–4, since the former were obtained with electrodes that had a heavier catalyst coating and were fabricated by a different method.

Figure 2:
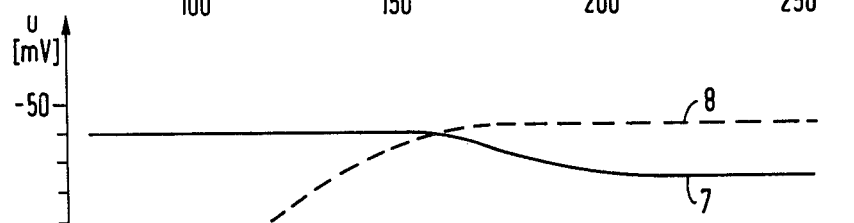
FIG. 2 depicts graphically life-test behavior of electrodes with the new catalyst.

FIG. 2 shows the behavior in continuous operation of two electrodes containing silver catalysts prepared according to the invention. The time ($t$, in hours) is plotted on the abscissa, and the voltage ($U$, in mV), measured against an Hg/HgO reference electrode, is plotted on the ordinate. An aqueous 6 N KOH solution served as the electrolyte, and oxygen at a pressure of 0.16 N/mm² as the reaction gas. The electrodes had a coating of 100 mg of catalyst per cm²; they were tested at a current density of 240 mA/cm².

Curve 7 of FIG. 2 shows data for a Bi/Co/Ni silver catalyst (containing about 0.7 weight % of Bi, 0.4% Co and 0.4% Ni) at an electrolyte temperature of 60°C. Curve 8 shows the data for a Bi/Ti/Ni silver catalyst (containing about 0.7% Bi, 0.1% Ti and 0.4% Ni) at an electrolyte temperature of 80°C. The voltage measured at the electrode with the Bi/Co/Ni silver catalyst against Hg/HgO rose from an initial value of about −40mV to about −25mV after approximately 1300 hours, at an electrolyte temperature of 60°C. The voltage determined at the electrode with the Bi/Ti/Ni silver catalyst (at an electrolyte temperature of 80°C) dropped within 1000 hours from an initial value of about +5mV to about −45mV and remained constant at that value for the remainder of the test. The Bi/Ti/Ni silver catalyst is distinguished by its high stability even at high electrolyte temperatures, such as 80°C. The Bi/Co/Ni silver catalyst exhibits the better behavior at temperatures of up to 60°C.

Figure 3:
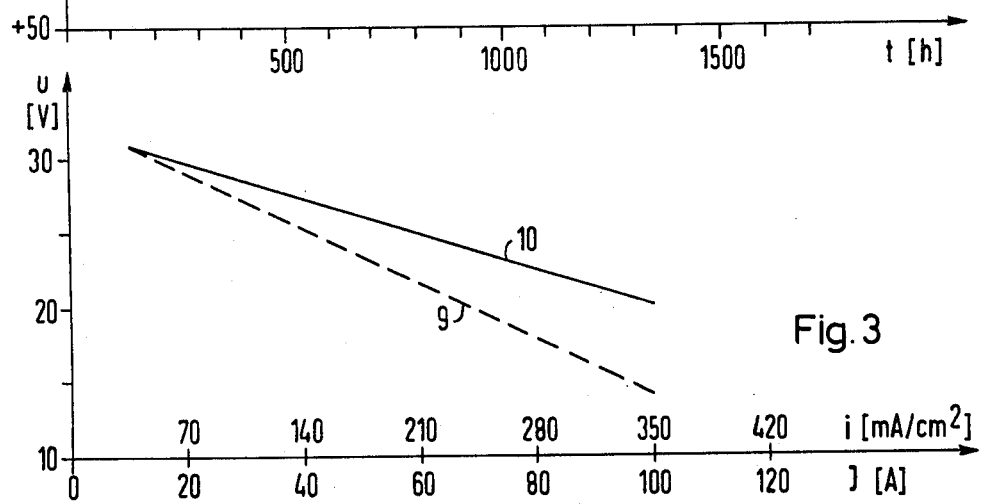
FIG. 3 depicts current-voltage curves of two fuel cell batteries.

In FIG. 3, the behavior of Raney silver and the silver catalyst of this invention is compared when employed in the cathodes of a fuel cell battery. The catalysts were used in each instance in the oxygen electrodes (cathodes) of an $H_2/O_2$ fuel cell battery of 33 fuel cells. The electrode area per electrode was 288 cm². The oxygen pressure and the hydrogen pressure were each 0.17 N/mm² (approx. 1.7 atm); the electrolyte was a 6 N KOH solution at 75°C. In FIG. 3, the current ($I$, in amperes) and also the current density ($i$, in mA/cm²) is plotted on the abscissa. The voltage ($U$, in volts) is plotted on the ordinate.

Curve 9 shows the current-voltage curve for the fuel cell battery with cathodes containing Raney silver. The electrodes contained polytetrafluoroethylene as the binder and had been prepared by rolling. The catalyst coating was 150 mg/cm².

Curve 10 shows the current-voltage curve for a fuel cell battery with cathodes which contained a Bi/Ti/Ni silver catalyst prepared in accordance with the invention, and contained about 0.7% by weight of Bi, 0.1% Ti and 0.4% Ni. The electrodes had been fabricated by the sedimentation method described above. The catalyst coating was 50 mg/cm².

Rolled electrodes of Raney nickel with polytetrafluoroethylene as the binder were used as the anodes in obtaining the data for curve 9 and 10.

FIG. 3 establishes that the silver catalysts made according to the invention exhibit substantial advantages over cathodes made of Raney silver. The new silver catalysts not only have a considerably increased activity, but they exhibit this activity at lower coating thicknesses. The coating can be reduced, for instance, down to 50 mg of silver catalyst per cm², without suffering an undue loss in activity. As not the least of their advantages, this leads to a considerable reduction of the cost for the catalyst.

The increase in activity of the silver catalysts according to the invention, as compared to Raney silver catalysts, is apparent from the curves of FIG. 3, which were obtained under comparable operational conditions. Referred to a voltage of, for instance, 24 V, an increase of the battery current from 47 A to about 69 A is obtained, i.e., an increase in power of about 45% (from 1.13 kW to 1.66 kW).

FIG. 4 schematically depicts a fuel cell in which a silver catalyst made according to the invention is employed in the oxygen electrode (cathode). The fuel cell may advantageously be constructed according to the principle of the "supported electrode" (see, for instance, F. V. Sturm, "Electrochemical Generation of Current" (Elektrochemische Stromerzeugung), Verlag Chemie, Weinheim/Bergstr., 1969, p. 109). The fuel cell in which hydrogen and oxygen may be reacted, was constructed as follows: A porous support frame 41, (sometimes denominated as a spacer), defines the electrolyte space and serves to accept the electrolyte (such as 6 N KOH). Support frame 41 may consist of a course-mesh nickel screen, or it may consist of a center layer in the form of a coarse-mesh screen as well as two adjacent fine-mesh screens.

Cover layers 42 having fine pores are disposed on support frame 41. Cover layers 42, in the form of asbestos diaphragms, are gastight when saturated with a liquid and thereby prevent the passage of gas into the electrolyte. Electrodes 43, 44 are located adjacent to cover layers 42. The oxygen electrode (cathode) 43 contains a silver catalyst of this invention. The hydrogen electrode (anode) 44 contains Raney nickel for example. The electrodes may be in the form of deposits of a powdered catalyst, or the electrode material may also be provided with a binder, such as polytetrafluoroethylene. In addition, the electrodes may contain asbestos fibers.

Fine-mesh nickel screens 45 are located adjacent to electrodes 43 and 44, and serve the purpose of establishing electrical contact, and define the access space for the respective reaction gases. Oxygen is supplied to the gas space adjoining cathode 43, and hydrogen is supplied to the gas space adjoining anode 44. The supply and discharge passages for the reaction gases are not shown in FIG. 4. In lieu of a single screen 45, the cell may be constructed with a fine-mesh screen which serves for electrical contact purposes, and an adjacent coarse mesh screen which serves primarily as the access space for the gas. Metal plates 46, optionally made of nickel, are located adjacent to screens 45; they serve as electrical leads. The fuel cell is closed by two end plates 47, which may optionally be made of plastic, such as a methacrylic acid ester.

Having thus described the invention, we claim:

1. A silver catalyst suitable for use as a fuel cell electrode material comprising an unleached composite of predominantly metallic silver disposed on two or more commingled hydroxides of bismuth, cobalt, iron, nickel and titanium, in which the total metal content of said hydroxides is in the range of from about 0.5 to about 5 weight %, based on the amount of silver in the finished composite.

2. The catalyst of claim 1 which comprises bismuth hydroxide.

3. The catalyst of claim 1 which comprises hydroxides of bismuth, cobalt and nickel.

4. The catalyst of claim 1 which comprises hydroxides of bismuth, nickel and titanium.

5. The catalyst of claim 1 which comprises hydroxides of bismuth, iron, nickel and titanium.

6. In the process of manufacture of a silver catalyst by chemical reduction in an alkaline aqueous medium of a dissolved silver salt and precipitation of metallic silver on a metal hydroxide gel contained in said medium, the improvement which comprises employing a commingled mixture of at least two metal hydroxides in gel form, said hydroxides being present in the reaction zone in essentially the same amount thereof as required in the finished catalyst, and said hydroxides having a total metal content in the range of from about 0.5 to about 5 weight % based on the amount of silver present in the finished catalyst.

7. In the process of claim 6, the further improvement of employing bismuth hydroxide as one of the hydroxides.

8. In the method of claim 6, the further improvement of employing a mixture of hydroxides of bismuth, nickel and titanium.

9. In the method of claim 8, the improvement of including iron hydroxide.

10. In the process of claim 6, the further improvement of employing a mixture of hydroxides of bismuth, cobalt and nickel.

* * * * *